(12) United States Patent  
Sato (10) Patent No.: US 12,283,384 B2  
(45) Date of Patent: Apr. 22, 2025

(54) NUCLEAR POWER PLANT

(71) Applicant: Takashi Sato, Kanagawa (CN)

(72) Inventor: Takashi Sato, Kanagawa (CN)

( * ) Notice: Subject to any disclaimer, the term of this patent is extended or adjusted under 35 U.S.C. 154(b) by 538 days.

(21) Appl. No.: 17/774,530

(22) PCT Filed: Oct. 4, 2020

(86) PCT No.: PCT/JP2020/037670  
§ 371 (c)(1),  
(2) Date: Nov. 21, 2022

(87) PCT Pub. No.: WO2021/075284  
PCT Pub. Date: Apr. 22, 2021

(65) Prior Publication Data  
US 2023/0070817 A1 Mar. 9, 2023

(30) Foreign Application Priority Data  
Oct. 19, 2019 (JP) .................. 2019-191608

(51) Int. Cl.  
*G21C 9/06* (2006.01)  
*G21C 13/02* (2006.01)  
*G21C 15/18* (2006.01)

(52) U.S. Cl.  
CPC ............. *G21C 9/06* (2013.01); *G21C 13/022* (2013.01); *G21C 15/18* (2013.01)

(58) Field of Classification Search  
CPC ... G21C 9/00; G21C 9/04; G21C 9/06; G21C 13/022  
See application file for complete search history.

(56) References Cited

U.S. PATENT DOCUMENTS 5,093,071 A * 3/1992 Kolditz ............... G21C 19/317  
376/300  
2004/0136489 A1 * 7/2004 Takahashi ............ G21C 13/00  
376/293  
(Continued)

FOREIGN PATENT DOCUMENTS

DE 4433901 A1 * 3/1996 ............... A62C 3/06  
GB 2056748 A * 3/1981 ............... B01F 3/02  
(Continued)

OTHER PUBLICATIONS

Lyu, Xuefeng, et al. "Impact of inert gas injection rate on reducing hydrogen risk during AP1000 post-inerting." Annals of Nuclear Energy 110 (2017): 230-233. (Year: 2017).*  
(Continued)

*Primary Examiner* — Sharon M Davis  
(74) *Attorney, Agent, or Firm* — Jose Cherson Weissbrot (57) ABSTRACT

According to an embodiment, a nuclear plant has: an outer well; an in-Containment Atmosphere Dilution System to inject a gas that has a low concentration of oxygen in the outer well into a containment vessel; an accumulator containing pressurized oxygen therein; and a passive containment cooling system including: a scrubbing pool arranged in the outer well; a cooling water pool installed above a dry well and the outer well; a heat exchanger partly submerged in a cooling water; a wet well gas supply pipe that is connected to an inlet plenum of the heat exchanger at one end and connected to a wet well gas phase at the other end; and a gas vent pipe that is connected to an outlet plenum of the heat exchanger at one end and is submerged in the scrubbing pool at the other end.

2 Claims, 8 Drawing Sheets

(56) References Cited

U.S. PATENT DOCUMENTS

| | | | |
|---|---|---|---|
| 2007/0092053 A1* | 4/2007 | Sato | ................ G21C 13/022 376/283 |
| 2013/0259184 A1 | 10/2013 | Sato | |
| 2014/0003567 A1 | 1/2014 | Sato et al. | |
| 2017/0162281 A1 | 6/2017 | Sato et al. | |
| 2018/0240558 A1* | 8/2018 | Sato | ................ G21C 15/182 |

FOREIGN PATENT DOCUMENTS

| | | |
|---|---|---|
| JP | S59116581 A | 7/1984 |
| JP | 2010032526 A | 2/2010 |
| JP | 2012117821 A | 6/2012 |
| JP | 2014010080 A | 1/2014 |
| JP | 2016014640 A | 1/2016 |
| JP | 2019051518 A | 4/2019 |
| JP | 2019124611 A | 7/2019 |
| WO | 2019142746 A1 | 7/2019 |

OTHER PUBLICATIONS

Bury, Tomasz Piotr. "Efficiency of selected methods of hydrogen removal from a nuclear reactor's containment building." Journal of Power Technologies 94.5 (2014): 96-104. (Year: 2014).*

* cited by examiner

NUCLEAR POWER PLANT

CROSS-REFERENCE TO RELATED APPLICATION

This application is based upon and claims the benefit of priority from Japanese Patent Application No. 2019-191608, filed on Oct. 19, 2019; the entire content of which is incorporated herein by reference.

FIELD

The embodiments of the present invention relate to a nuclear plant having a flammable gas control system for a passive containment cooling system.

BACKGROUND

An outline of a conventional passive containment cooling system of a nuclear power plant will be described with reference to FIGS. 5 to 8.

Figure 5:
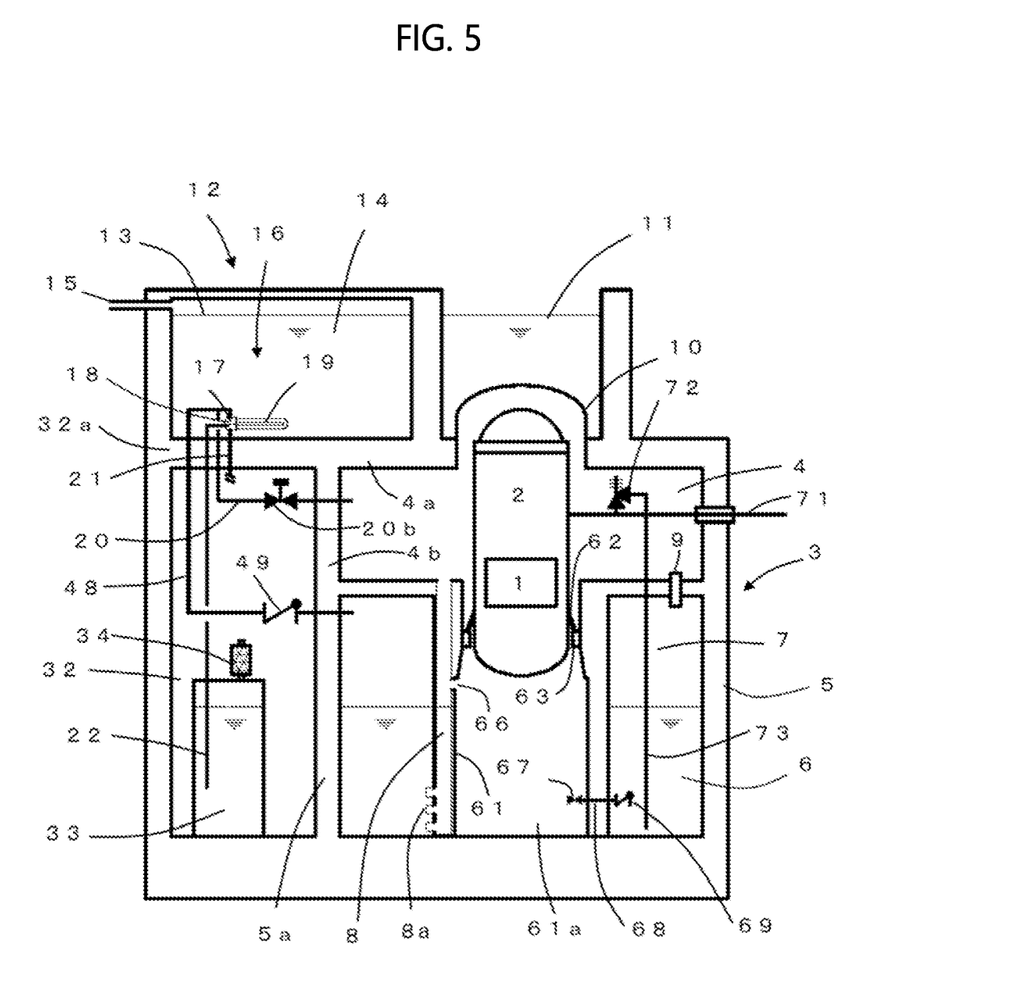
FIG. 5 is a sectional elevational view showing an example of a configuration of a conventional passive containment cooling system and a containment vessel.

<Explanation Relating to FIG. 5: The Conventional Nuclear Power Plant>

FIG. 5 is a sectional elevational view showing an example of a configuration of a containment vessel of the conventional nuclear power plant. In FIG. 5, a core 1 is contained in a reactor pressure vessel 2. The reactor pressure vessel 2 is contained in a containment vessel 3. The containment vessel 3 has a cylindrical shape (See FIG. 6).

The interior space in the containment vessel 3 is partitioned into a dry well 4, which contains the reactor pressure vessel 2, and a wet well 5. The dry well 4 and the wet well 5 each constitutes a part of the containment vessel 3. The wet well 5 forms a suppression pool 6 inside. A wet well gas phase 7 is formed above the suppression pool 6. The outer wall parts of the dry well 4 and the wet well 5 are integrated to constitute a cylindrical outer wall part of the containment vessel 3. The ceiling part of the dry well 4 is a flat plate, which will be referred to as a top slab 4a of the dry well 4.

In the case of a boiling water reactor, the atmosphere in the containment vessel 3 is inerted by nitrogen and limited to a low oxygen concentration. For example, a concentration of oxygen is limited to not more than 3.5%.

Figure 6:
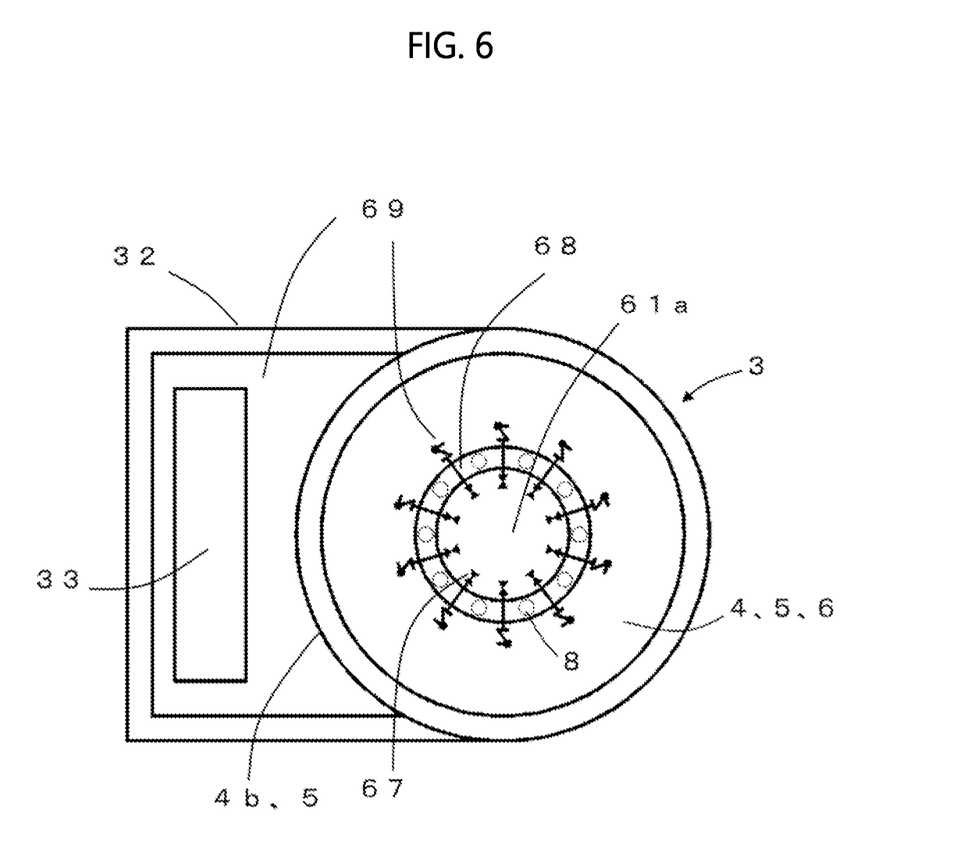
FIG. 6 is a plan view showing an example of a configuration around a containment vessel of a conventional nuclear power plant.
Figure 7:
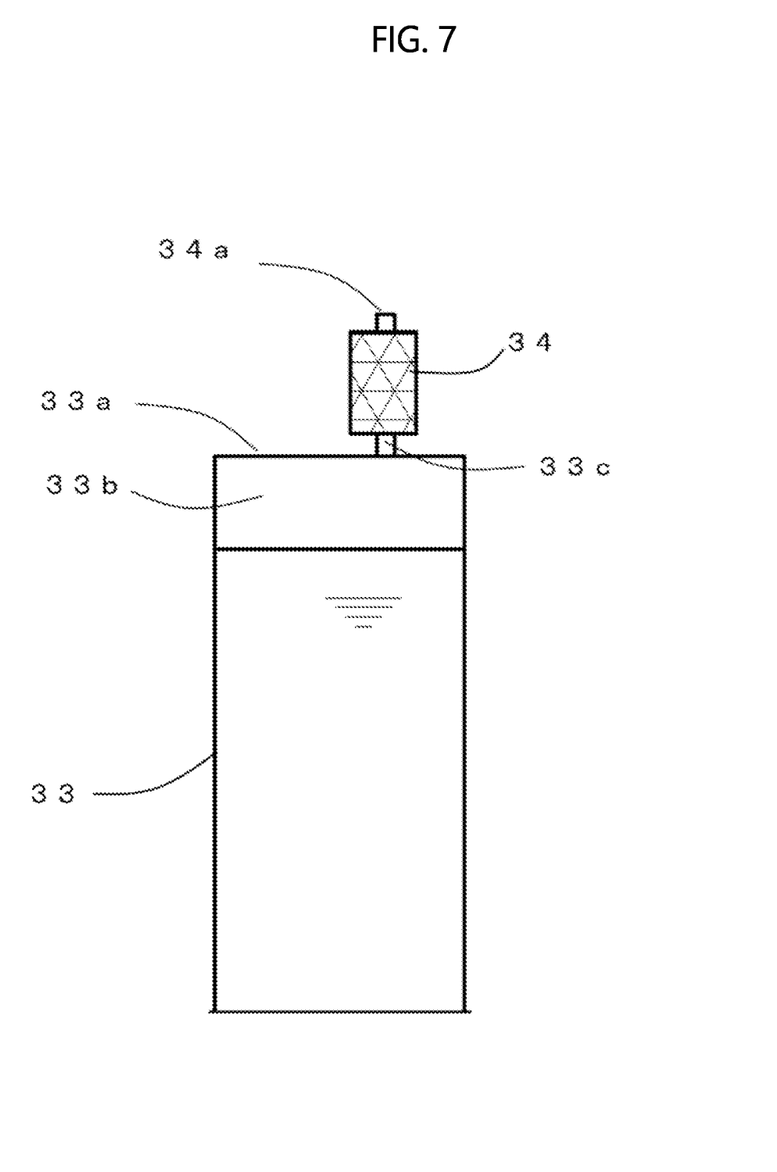
FIG. 7 is a sectional elevational view showing a configuration of a scrubbing pool of the conventional nuclear power plant.

In general, there are various types of containment vessels 3 depending on the materials. Examples include a steel containment vessel, a reinforced concrete containment vessel (RCCV), a pre-stressed concrete containment vessel (PCCV), and a steel concrete composite (SC composite) containment vessel (SCCV). In the cases of RCCV and PCCV, the inner surfaces are lined with a steel liner. FIG. 6 shows an example of an RCCV. As shown in FIG. 6, an RCCV has an outer wall part of cylindrical shape.

The reactor pressure vessel 2 is supported by a cylindrical pedestal 61 via an RPV skirt 62 and an RPV support 63. The pedestal 61 may be made of steel, concrete, or a composite structure of both. In the dry well 4, the inside space of the pedestal 61, below the reactor pressure vessel 2 and surrounded by the cylindrical wall of the pedestal 61, is referred to as a pedestal cavity 61a. In the case of the RCCV of an ABWR, the cylindrical wall of the pedestal 61 forms a boundary wall between the wet well 5 and the dry well 4. The space is referred to as a lower dry well in particular.

A containment vessel head 10 is arranged above the reactor pressure vessel 2. A water shield 11 is arranged over the containment vessel head 10.

Main steam pipes 71 extend from the reactor pressure vessel 2 to outside the dry well 4. A safety relief valve (SRV) 72 is arranged on the main steam pipes 71. A discharge pipe 73 is arranged to be submerged in the suppression pool 6 so that the steam in the reactor pressure vessel 2 is released into the suppression pool 6 if the safety relief valve 72 is activated. Although there are plenty of safety relief valves 72 and discharge pipes 73, only one set of a safety relief valve 72 and a discharge pipe 73 is depicted for simplicity.

The dry well 4 and the suppression pool 6 are connected by LOCA vent pipes 8. There are installed a plurality of, for example, ten LOCA vent pipes 8, whereas FIG. 5 shows only two of them (See FIG. 6). The LOCA vent pipes 8 have horizontal vent pipes 8a in the portions submerged in the pool water of the suppression pool 6. The horizontal vent pipes 8a open in the pool water. In the case of an RCCV, three horizontal vent pipes 8a are vertically arranged on each LOCA vent pipe 8. In the case of the RCCV the LOCA vent pipes 8 are installed through the cylindrical wall of the pedestal 61. In the case of the RCCV, the cylindrical wall of the pedestal 61 is thus also referred to as a vent wall. The vent wall is made of reinforced concrete with a thickness of approximately 1.7 m. The inner and outer surfaces are made of steel. The LOCA vent pipes 8 and the pedestal 61 constitute a part of the containment vessel 3.

Vacuum breakers 9 are provided for the purpose of letting the gas in the wet well gas phase 7 flow back into the dry well 4. There are provided a plurality of, for example, eight vacuum breakers 9, whereas FIG. 5 shows only one of them.

The vacuum breakers 9 may be formed on the wall surface of the wet well 5, on the ceiling of the wet well 5, and on the LOCA vent pipes 8. The vacuum breakers 9 are activated to open if the pressure in the wet well 5 exceeds that in the dry well 4 and the difference in pressure exceeds a set pressure difference. For example, the set pressure difference of the vacuum breakers 9 is approximately 2 psi (approximately 13.79 kPa). The vacuum breakers 9 constitute a part of the containment vessel 3.

<Explanation of an Outer Well>

Furthermore, an outer well 32 is provided outside the dry well 4 and the wet well 5. The outer well 32 adjoins the dry well 4 via a dry well common part wall 4b, and adjoins the wet well 5 via a wet well common part wall 5a. The ceiling part of the outer well 32 is a flat plate, which will be referred to as a top slab 32a of the outer well 32. The atmosphere in the outer well 32 is inerted by nitrogen and limited to a low oxygen concentration. For example, a concentration of oxygen is limited to not more than 3.5%. The outer well 32 has pressure resistance and gas tightness equivalent to those of the dry well 4 and the wet well 5.

The same materials as those of the containment vessel 3 may all be used for the outer well 32, such as reinforced concrete (RC), an SC composite, and steel. In the case of reinforced concrete, liners are laid on the inner surfaces as with the containment vessel 3. As shown in FIG. 6, the outer well 32 according to the present prior art has a rectangular shape in a top plan view and is configured to surround a part of the outer walls of the dry well 4 and the wet well 5.

<Explanation Relating to FIG. 7: A Scrubbing Pool>

Furthermore, a scrubbing pool 33 storing water inside is arranged in the outer well 32. A lid 33a covers the top of the scrubbing pool 33 (See FIG. 7). A space 33b is formed between the lid 33a and the pool water. A first outlet pipe 33c opening to the space 33b is arranged on the top of the lid 33a. A metal fiber filter 34 is connected to and arranged on one end of the first outlet pipe 33c. The metal fiber filter 34 is further connected with a second outlet pipe 34a which opens to the interior of the outer well 32 at the other end.

The space 33b is needed if the water level rises as the gas in the dry well 4 is vented from a gas vent pipe 22. The lid 33a is needed to prevent the water from flowing out due to sloshing at the time of an earthquake in not only normal operation but also an accident. The amount of the water in the scrubbing pool 33 is large and about 500 m3 in the present prior art. Therefore, the scrubbing pool 33 according to the present prior art has a rectangular shape in a top plan view (See FIG. 6).

<Explanation of a Passive Containment Cooling System (PCCS)>

A passive containment cooling system (PCCS) 12 of a conventional nuclear power plant will be outlined with reference to FIG. 5. A cooling water pool 13 is arranged above the containment vessel 3 and the outer well 32. The cooling water pool 13 stores cooling water 14 inside. The cooling water pool 13 may be of either a pool type or a tank type. FIG. 5 shows an example of a pool type. In the case of the pool type, the top of the cooling water pool 13 is covered with a lid.

An exhaust port 15 for releasing steam to the environment is arranged on the gas phase in the upper part of the cooling water pool 13. An insect screen may be arranged on the outlet of the exhaust port 15. The cooling water pool 13 is usually located above the containment vessel 3 and the outer well 32. The cooling water pool 13 may be arranged beside the containment vessel 3 and the outer well 32.

A heat exchanger 16 is installed in the cooling water pool 13 to be submerged at least in part in the cooling water 14. It is shown that the heat exchanger 16 is arranged to be submerged completely in the cooling water 14 as an example for the present prior art.

A plurality of the heat exchangers 16 may often be installed, although FIG. 5 shows only one heat exchanger 16. The heat exchanger 16 includes an inlet plenum 17, an outlet plenum 18, and heat exchanger tubes 19 (See FIG. 8). The heat exchanger 16 in total at least has a cooling capacity for condensing steam equivalent to decay heat.

FIG. 5 shows an example in which the entire heat exchanger 16, including the inlet plenum 17 and the outlet plenum 18, is installed inside the cooling water pool 13. However, the configuration is not limited to this example. For example, only the heat exchanger tubes 19 are installed inside the cooling water pool 13, and the inlet plenum 17 and the outlet plenum 18 protrude out of the cooling water pool 13

A wet well gas supply pipe 48 is connected to the inlet plenum 17 of the heat exchanger 16. The wet well gas supply pipe 48 has one end opened in the wet well gas phase 7, penetrates the side wall (outer wall) of the wet well 5, passes inside the outer well 32, penetrates the top slab 32a of the outer well 32, and has the other end connected to the inlet plenum 17. In the conventional example, a dry well gas supply pipe 20 is further arranged. The dry well gas supply pipe 20 has one end opened in the dry well 4, penetrates the side wall (outer wall) of the dry well 4, passes inside the outer well 32, penetrates the top slab 32a of the outer well 32, and has the other end connected to the wet well gas supply pipe 48. An isolation valve 20a is arranged on the dry well gas supply pipe 20 and closed during normal operation.

A condensate return pipe 21 is connected to the lower part of the outlet plenum 18. The condensate return pipe 21 penetrates the top slab 32a of the outer well 32, passes inside the outer well 32, and has a tip submerged in the suppression pool 6 in the wet well 5 (See FIG. 1 of the patent document 1). Since the condensate return pipe 21 is arranged to pass inside the outer well 32, it is configured that radioactive materials such as CsI are not released directly into the environment even if condensate leakage occurs. Although the tip of the condensate return pipe 21 is submerged in the suppression pool 6 in the prior art as an example, it is not limited to this example. There are also examples where a tip is led into the dry well 4 or a LOCA vent pipe 8.

The structure of a tip into the LOCA vent pipe 8, however, has a problem of increasing pressure drop in the LOCA vent pipe 8 in a LOCA. The structure of a tip into the dry well 4 needs a PCCS drain tank for water sealing to prevent a reverse flow and also has a problem of space requirement. If there is no enough space it is not applicable.

Although plenty of particulate radioactive materials such as CsI are included in the atmosphere in the containment vessel 3 in a core melt accident, most of the particulate radioactive materials are transferred into the condensate when steam condenses in the heat exchanger 16. Since the condensate including the plenty of CsI is returned into the pool water in the suppression pool 6 by the condensate return pipe 21 and held therein, the passive containment filtered venting system of the present prior art is configured to remove passively the airborne particulate radioactive materials in the containment vessel 3.

Therefore, the present prior art has an equivalent effect as if an active containment spray washes out particulate radioactive materials and returns them into the pool water in the suppression pool 6. Further, the condensate return pipe 21 is not arranged into the LOCA vent pipe 8 for the present prior art and configured not to increase pressure drop in the LOCA vent pipe 8 in a LOCA.

Further, the gas vent pipe 22 is connected to the upper part of the outlet plenum 18. The gas vent pipe 22 penetrates the top slab 32a of the outer well 32, passes inside the outer well 32, and has a tip arranged being submerged in the scrubbing pool 33. As the gas vent pipe 22 is arranged as such passing inside the outer well 32, it is configured that radioactive materials such as noble gases, organic iodine, and CsI are not released directly to the environment even if gases leak out. Among them it is configured that particulate radioactive materials such as CsI are scrubbed in the pool water of the scrubbing pool 33, and furthermore those carried over by water droplet are removed by the metal fiber filter 34.

Owing to this it became possible to eliminate the necessity of long-term relocation of the surrounding population by land contamination due to release of particulate radioactive materials such as CsI. Radioactive noble gases and organic iodine are released to the outer well 32 through the second outlet pipe 34a and also held up inside the outer well 32. Owing to this it became possible to eliminate the necessity of emergency evacuation of surrounding population beforehand or iodine prophylaxis, whereas those emergency responses are necessary for the older conventional nuclear power plant as the conventional filtered venting system releases radioactive noble gases and organic iodine directly to the environment when activated.

Further, in the present prior art, it is possible to keep the pressure of the dry well 4 and the wet well 5 sufficiently low even if a large amount of hydrogen generated by metal-water reaction of fuel cladding in a severe accident because hydrogen is also released into the outer well 32 by the gas vent pipe 22. As the atmosphere in the outer well 32 is inerted by nitrogen, no detonation occurs even if a large amount of hydrogen is contained therein.

<Explanation of a Flooder Pipe>

In the present prior art, a flooder pipe 68 for flooding the lower dry well is provided through the wall of the pedestal 61. The flooder pipe 68 is led into the lower dry well (pedestal cavity) 61a at one end, and opens in the suppression pool 6 at the other end. A flooder valve 67 is arranged on the part of the flooder pipe 68 inside the lower dry well 61a. A check valve 69 is arranged on the flooder pipe 68. The provision of the check valve 69 can prevent high-temperature water in the lower dry well 61a from flowing back to the suppression pool 6, even if the pressure in the dry well 4 increases. A total of ten flooder pipes 68 are installed to not overlap with the LOCA vent pipes 8, for example, in intermediate positions between the LOCA vent pipes (See FIG. 6).

The flooder valves 67 may be fusible valves. Fusible valves melt and open by heat of debris. Besides fusible valves, however, any valves that do not need AC power for operation at the time of an SBO can be used. For example, squib valves which use an explosive for operation may be employed. For activation high temperature signal that detects heat of debris is used. Spring valves which use spring force for operation may also be employed. For activation wires holding springs melt by heat of debris. For improved reliability, five of the ten flooder valves may be squib valves and the other five may be spring valves. Otherwise, five may be fusible valves and the other five may be squib valves. At least two or more types among fusible, squib, and spring valves may be used in combination.

Figure 8:
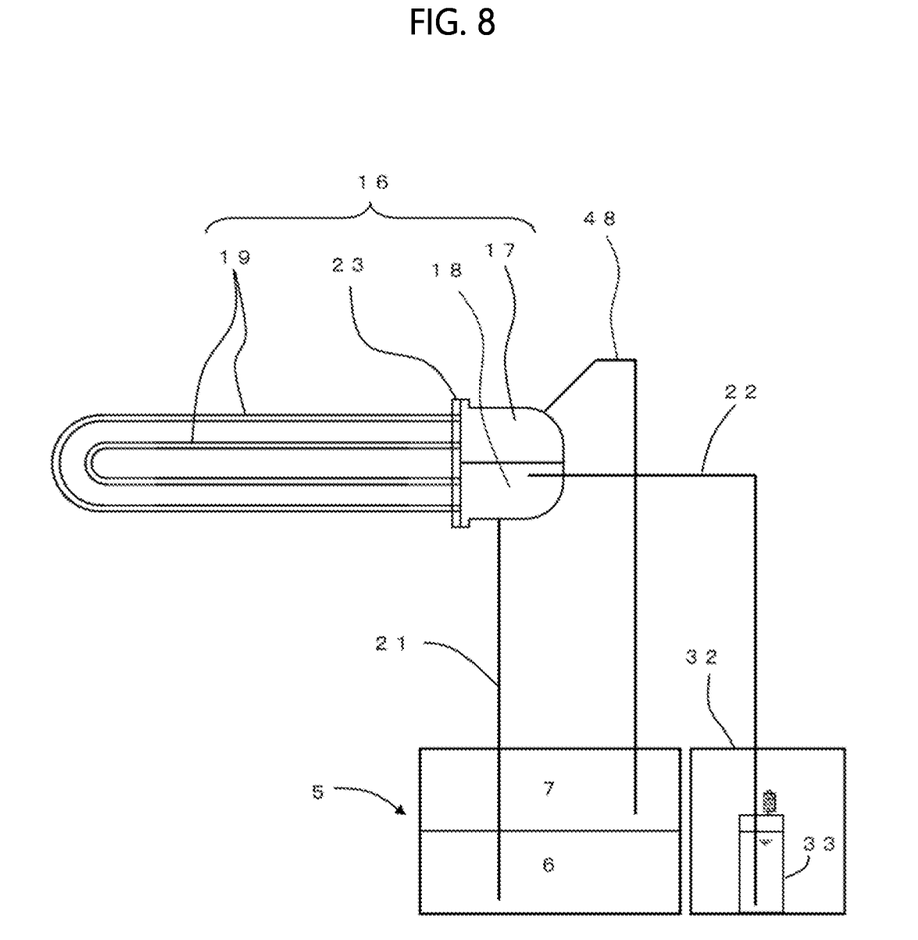
FIG. 8 is a sectional elevational view showing an example of a heat exchanger of a conventional passive containment cooling system.

<Explanation Relating to FIG. 8: A Heat Exchanger of a PCCS>

FIG. 8 is an elevational cross-sectional view of a heat exchanger of a passive containment cooling system of the prior art. Now, a structure of the heat exchanger 16 of the passive containment cooling system 12 of the prior art is explained using an example of a horizontal heat exchanger.

As shown in FIG. 8, the outlet plenum 18 is disposed below the inlet plenum 17. Many U-shaped heat exchanger tubes 19 are connected to a tube plate 23. Straight parts of the heat exchanger tubes 19 extend horizontally. In FIG. 8, only two heat exchanger tubes are illustrated out of much more heat exchanger tubes 19 for simplicity of illustration. The cooling water 14 (See FIG. 5) is filled outside of the heat exchanger tubes 19. The inlets of the heat exchanger tubes 19 are open to the inlet plenum 17. The outlets of the heat exchanger tubes 19 are open to the outlet plenum 18.

The wet well gas supply pipe 48 is connected to the inlet plenum 17, through which a mixture gas of nitrogen, hydrogen, steam and so on in the wet well gas phase 7 is supplied to the inlet plenum 17. The mixture gas is introduced into the heat exchanger tubes 19. Then, the steam is condensed into condensate, which flows out to the outlet plenum 18 via the outlets of the heat exchanger tubes 19, and then, accumulate in lower part of the outlet plenum 18

The condensate return pipe 21 is connected to the lower part of the outlet plenum 18. The condensate in the outlet plenum 18 returns to inside of the containment vessel 30 by gravity via the condensate return pipe 21. The gas vent pipe 22 is connected to upper part of the outlet plenum 18. Non-condensable gases such as nitrogen and hydrogen that have not condensed in the heat exchanger tubes 19 are exhausted from the heat exchanger tubes 19 and accumulate in the upper part of the outlet plenum 18.

The tip of the gas vent pipe 22 is led into the scrubbing pool 33 in the outer well 32 and submerged in the pool water. The non-condensable gases in the outlet plenum 18 flow through the gas vent pipe 22, push the pool water in the scrubbing pool 33 downward, vented into the pool water, and then transfer to the space 33b between the lid 33a and the pool water. Then, the non-condensable gases transfer to the inside of the outer well 32 through the first outlet pipe 33c, the metal fiber filter 34 and the second outlet pipe 34a.

The structure of the heat exchanger tubes 19 are not limited to horizontal U-shaped type. In an alternative example, the heat exchanger tubes 19 may be disposed with their straight tube parts extending vertically. The inlet plenum 17 is always positioned above the outlet plenum 18. Thus, the condensate condensed in the heat exchanger tubes 19 is guided to the outlet plenum 18 by gravity. The horizontal-type heat exchanger has an advantage in resistance to earthquake and in efficiency in utilizing the cooling water 14. The vertical-type heat exchanger has an advantage in drainage of the condensate.

<Explanation of Function of a PCCS>

Next, function of a passive containment cooling system being configured as such will be explained.

If a severe accident occurs and damage of the core 1 begins in the reactor pressure vessel 2, a large amount of hydrogen is generated by metal-water reaction between the cladding of heated core fuels and the coolant. This hydrogen is released by the safety relief valve 72 to the suppression pool 6 and transfers to the wet well gas phase 7. As the atmosphere in the wet well gas phase 7 is inerted by nitrogen to lower the oxygen concentration, no detonation of hydrogen occurs. The pressure in the wet well gas phase 7 rises due to the hydrogen in addition to the originally existing nitrogen. The pressurized mixture gas in the wet well gas phase 7 is led into the heat exchanger 16 by the wet well gas supply pipe 48 and released to the scrubbing pool 33 by the gas vent pipe 22. This mixture gas further passes through the space 33b, the first outlet pipe 33c, the metal fiber filter 34 and the second outlet pipe 34a, and is released to the interior of the outer well 32. As the interior of the outer well 32 is inerted with nitrogen to lower the oxygen concentration, no detonation of hydrogen occurs.

Further, as melting of core fuels progresses, debris (high-temperature substance of wrecks of the melted core 1 releasing heat owing to decay heat) melts the bottom of the reactor pressure vessel 2 and drops onto the lower part of the pedestal cavity (the lower dry well) 61a. As the flooder valves 67 open due to the heat of debris, the pool water in the suppression pool 6 flows into the lower dry well 61a through the flooder pipes 68 and floods the debris. At this moment a large amount of steam is generated. This steam becomes a mixture gas with originally existing nitrogen in the dry well 4 and causes a rapid pressure increase in the dry well 4. This mixture gas of steam and nitrogen is released into the suppression pool 6 through the LOCA vent pipes 8. In the process, steam is cooled by the pool water and condensed. Nitrogen is not condensed and released into the wet well gas phase 7. Then, this nitrogen is led to the heat exchanger 16 by the wet well gas supply pipe 48, further, vented to the scrubbing pool 33 in the outer well 32 by the gas vent pipe 22, and finally vented to the interior of the outer well 32. Due to this process, the atmosphere in the dry well 4 is mostly occupied by steam. On the contrary, the wet well gas phase 7 is mainly occupied by nitrogen and hydrogen. Oxygen concentration decreases to about 2%.

The debris that has dropped on to the bottom of the lower dry well 61a has decay heat, heats up the water flooded on the lower part of the lower dry well 61a, and continues to generates steam. This steam is continuously released to the suppression pool 6 and heats up the pool water. As the pool water soon becomes saturated and not able to condense steam, steam will be released to the wet well gas phase 7. As a result, gases in the wet well gas phase 7 is pressurized again and led to the heat exchanger 16 by the wet well gas supply pipe 48. Steam is cooled by the heat exchanger 16 and becomes condensate. The condensate is accumulated in the lower part of the outlet plenum 18 and returned to the suppression pool 6 by the condensate return pipe 21. Nitrogen, hydrogen and oxygen are vented to the scrubbing pool 33 in the outer well 32 and finally vented in the interior of the outer well 32. Owing to this process, the wet well gas phase 7 is mostly occupied by steam.

Since all the noncondensable gases in the wet well gas phase 7 are vented and out of existence, venting of gases to the scrubbing pool via the gas vent pipe 22 is stopped. In this stage some nitrogen, hydrogen, and oxygen remain in the heat exchanger tubes 19, the outlet plenum 18, and the gas vent pipe 22 of the heat exchanger 16. No detonation, however, occurs because the oxygen concentration is limited low.

In this way, in the case of the conventional passive containment cooling system shown in FIG. 5, the dry well 4 and the wet well gas phase 7 become occupied mostly by steam in the stage in which the passive containment cooling system begins cooling of steam genuinely in a severe accident. Almost all the nitrogen and oxygen existed in the dry well 4 and the wet well gas phase 7 are vented to the outer well 32. Almost all the hydrogen generated from the core is also vented to the outer well 32.

In this way, after almost all the noncondensable gas is vented to the outer well 32, exhaust of noncondensable gas by the conventional passive containment cooling system 12 is stopped and only small amount of noncondensable gas remains in the heat exchanger tubes 19, the outlet plenum 18 and the gas vent pipe 22. The main constituents of this noncondensable gas are nitrogen and hydrogen. In this gas only 2% oxygen is included and no detonation occurs.

In a severe accident, however, there is flooding water for debris cooling in the lower part of the lower drywell 61*a*. This water dissolves into hydrogen and oxygen by radiation from the debris. Further, the pool water in the suppression pool 6 also dissolves into hydrogen and oxygen by radiation from fission products trapped in the pool water. The amount of hydrogen and oxygen generated by radiolysis depends on G value (number of molecules generated per 100 eV of absorbed energy). As G value is small the amount of hydrogen and oxygen generated is not large. The amount of hydrogen and oxygen generated also depends on a plant output. In the case of 1350 MWe class plant, also depending on a condition of an accident, hydrogen generation rate is about 5 m$^3$/h and oxygen generation rate is about 2.5 m$^3$/h at pressure and temperature conditions in an accident. The free volume of the dry well 4 and the wet well gas phase 7 is about 13,300 m3 in total and occupied by a large amount of steam in an accident. Therefore, the concentrations of hydrogen and oxygen do not exceed the inflammability limits in the dry well 4 and the wet well gas phase 7 in a short time.

Hydrogen and oxygen generated by radiolysis in the dry well 4 is carried over by steam, released into the pool water in the suppression pool 6 by way of the safety relief valve 72 or the LOCA vent pipes 8, and transferred into the wet well gas phase 7. As flow rate of the steam is very huge (about 10,000 m3/h), hydrogen and oxygen generated by radiolysis in the dry well 4 are all carried over by the steam and transferred into the wet well gas phase 7. Therefore, the concentrations of hydrogen and oxygen do not exceed the inflammability limits in the dry well 4 even in a long time. The dry well 4 is ventilated by the huge amount of steam generated in the dry well 4 and vented into the wet well 5. This is one of the inherent safety of a pressure suppression type containment vessel.

Hydrogen and oxygen generated by radiolysis of the pool water in the suppression pool 6 and transferred hydrogen and oxygen generated by radiolysis in the dry well 4 are carried over by a large amount of steam generated from the heated pool water in a severe accident, absorbed into the heat exchanger 16 through the wet well gas supply pipe 48, and then exhausted into the outer well 32 through the gas vent pipe 22. Therefore, the concentrations of hydrogen and oxygen generated by radiolysis in the wet well gas phase 7 do not exceed the inflammability limits even in a long time. This is one of the inherent safety of the conventional passive containment cooling system shown in FIG. 5 and the outer well 32. Without the outer well 32 this inherent safety is not attained.

As the outer well 32 contains a large amount of nitrogen and hydrogen, the oxygen concentration is limited low (about 2% owing to dilution of hydrogen in the case of initial oxygen concentration of 3.5%). Therefore, the oxygen concentration will not exceed the inflammability limit easily even if hydrogen and oxygen generated by radiolysis are vented therein.

However, a large amount of steam in the wet well gas phase 7 carries over the low-concentration hydrogen and oxygen in the wet well gas phase 7, reaches into the heat exchanger tubes 19 of the heat exchanger 16 thorough the wet well gas supply pipe 48, and then condenses in the heat exchanger tubes 19. As the steam condenses, concentrations of hydrogen and oxygen increase in the heat exchanger tubes 19. In the heat exchanger tubes 19 the nitrogen and hydrogen that has not been vented to the outer well 32 originally remain with concentration of about 50%. Namely, noncondensable gas remains with about 50% concentration and steam is existing with the rest of about 50% concentration. Even if steam condenses, the wet well gas supply pipe 48 makes up steam constantly and keep the concentration of steam mostly unchanged. In the remaining mixture gas of nitrogen and hydrogen in the heat exchanger tubes 19, almost no oxygen is included (about 2% oxygen concentration owing to the dilution by hydrogen). Therefore, even if hydrogen and oxygen generated by radiolysis flow into the interior of the heat exchanger tubes 19, the inflammability limits are not exceeded immediately.

However, hydrogen and oxygen are generated continuously by radiolysis in the containment vessel 3 and supplied continuously into the heat exchanger tubes 19 with very small rate and amount, though. This additional hydrogen and oxygen push the preexisting nitrogen and hydrogen in the heat exchanger tubes 19 into the outlet plenum 18 and the gas vent pipe 22 and vent them continuously into the scrubbing pool 33. The rate and amount are the same as those of hydrogen and oxygen generated anew by radiolysis. Namely, with very slow speed, the nitrogen and hydrogen in the gas vent pipe 22 are pushed into the scrubbing pool 33. As this process proceeds, the composition of the noncondensable gas in the heat exchanger tubes 19, the outlet plenum 18, and the gas vent pipe 22 becomes mostly hydrogen 2 and oxygen 1. Assuming the concentration of noncondensable gas is about 50%, a mixture gas with concentrations of 50% of steam, 33% of hydrogen, 17% of oxygen will be formed in the passive containment cooling system 12. Since this mixture gas exceeds the inflammability limits, there is the possibility of detonation. Since the space 33*b* in the upper part of the scrubbing pool 33 will also be mostly occupied by the same mixture gas, there is the possibility of detonation. The timing that this situation is reached depends on the rates of hydrogen and oxygen generation by radiolysis, namely, the numbers of G values. It is supposed that this situation is reached in several days after the occurrence of a severe accident. It is necessary to prevent the formation of the flammable gas in such a way in the passive containment cooling system 12 in the long term.

There is the conventional flammable gas control device using a catalyst such as platinum and palladium. This is a way to recombine hydrogen and oxygen by distributing catalysts in the dry well 4 and the wet well 5. However, the effect of distributing catalysts in the dry well 4 is little because the flammable gas in the dry well 4 is exhausted to the wet well 5 by way of the LOCA vent pipes 8 or the safety relief valve 72. The effect of distributing catalysts in the wet well 5 is also little because the flammable gas in the wet well 5 is exhausted to the heat exchanger 16 by way of the wet well gas supply pipe 48 of the passive containment cooling system 12. In this way, for the flammable gas formed in the passive containment cooling system 12, the effect of the conventional countermeasures of distributing catalysts in the dry well 4 and the wet well 5 is little because flammable gas is not accumulated in the dry well 4 and the wet well 5.

It is effective to install a catalyst in the passive containment cooling system 12. However, a space where a catalyst can be installed is limited to the outlet plenum 18 in the passive containment cooling system 12. It is impossible to install a catalyst in the heat exchanger tubes 19 and the gas vent pipe 22 because a catalyst impedes smooth gas flow therein. Therefore, there is a possibility that detonation occurs in the heat exchanger tubes 19 and the gas vent pipe 22. Moreover, since a catalyst in the outlet plenum 18 generates heat and becomes hot when it recombines a flammable gas, there is a problem that it distorts the heat balance in the passive containment cooling system 12 and impedes the proper cooling function.

Furthermore, since it takes a certain time for a catalyst to recombine a gas, it is effective when a flammable gas is generated taking time slowly, but a catalyst cannot catch up with a quick phenomenon where concentration of a flammable gas becomes high quickly by condensation of steam in the heat exchanger tubes 19. A high-concentration flammable gas is released into the outlet plenum 18 and the inflammability limits is already exceeded. In this situation, even if a catalyst is installed in the outlet plenum 18, there is no assurance that a catalyst can prevent detonation, and there is rather a possibility that a catalyst rather evoke detonation.

The conventional flammable gas control system (FCS) also has a function to recombine a flammable gas by taking out a gas from the dry well 4 and the wet well 5. Therefore, the conventional flammable gas control system (FCS) has little effect for the flammable gas formed in the passive containment cooling system 12. It is effective to inject nitrogen into a containment vessel by the conventional containment atmosphere dilution system (CAD) that is an old countermeasure before the conventional flammable gas control system (FCS) was adopted. However, since generation of hydrogen and oxygen by radiolysis does not cease, the conventional containment atmosphere dilution system (CAD) must continue to inject nitrogen in to a containment vessel and pressurizes a containment vessel. Therefor, it is not a good countermeasure. In the same way, separation of nitrogen and injection of nitrogen into a containment vessel by the conventional Pressure Swing Adsorption (PSA) is not a good countermeasure because the conventional Pressure Swing Adsorption (PSA) also must continue to inject nitrogen into a containment vessel and pressurizes a containment vessel as generation of hydrogen and oxygen by radiolysis does not cease.

PRIOR ART DOCUMENTS

Patent Documents

Patent Document 1: Japanese Patent Application Laid-Open Publication No. 2016-14640

SUMMARY OF THE INVENTION

Problems to be Solved by the Invention

The conventional catalyst and the conventional flammable gas control system (FCS) cannot control the concentration of a flammable gas accumulated by radiolysis of water in the passive containment cooling system 12 under the inflammability limits. The conventional countermeasures to inject nitrogen from outside to a containment vessel also cannot control the concentration of a flammable gas accumulated by radiolysis of water in the passive containment cooling system 12 under the inflammability limits without pressurizing a containment vessel, since generation of hydrogen and oxygen by radiolysis do not cease and nitrogen injection must be continued.

Means for Solving the Problems

The most main feature of the present invention is that the present invention returns the gas in the outer well 32 to the containment vessel 3, control the concentration of oxygen in the passive containment cooling system 12 and the scrubbing pool 33, and prevent a flammable gas from being formed in the passive containment cooling system 12 and the scrubbing pool 33.

Advantage of the Invention

According to an embodiment of the present invention, even if a severe accident accompanied by a core meltdown occurs due to a station blackout (SBO) and the like, detonation of hydrogen can be prevented by controlling the concentration of oxygen in the passive containment cooling system and the scrubbing pool without pressurizing the containment vessel.

DETAILED DESCRIPTION

A nuclear plant having a flammable gas control system for a flammable gas in a passive containment cooling system according to embodiments of the present invention will be described below with reference to FIGS. 1 to 4. The same or similar parts as/to those of the prior art, and the same or similar parts between the following embodiments, will be designated by the same reference numerals. Redundant descriptions will be omitted, and only essential parts will be described.

First Embodiment

<Explanation of a Containment Vessel>

Figure 1:
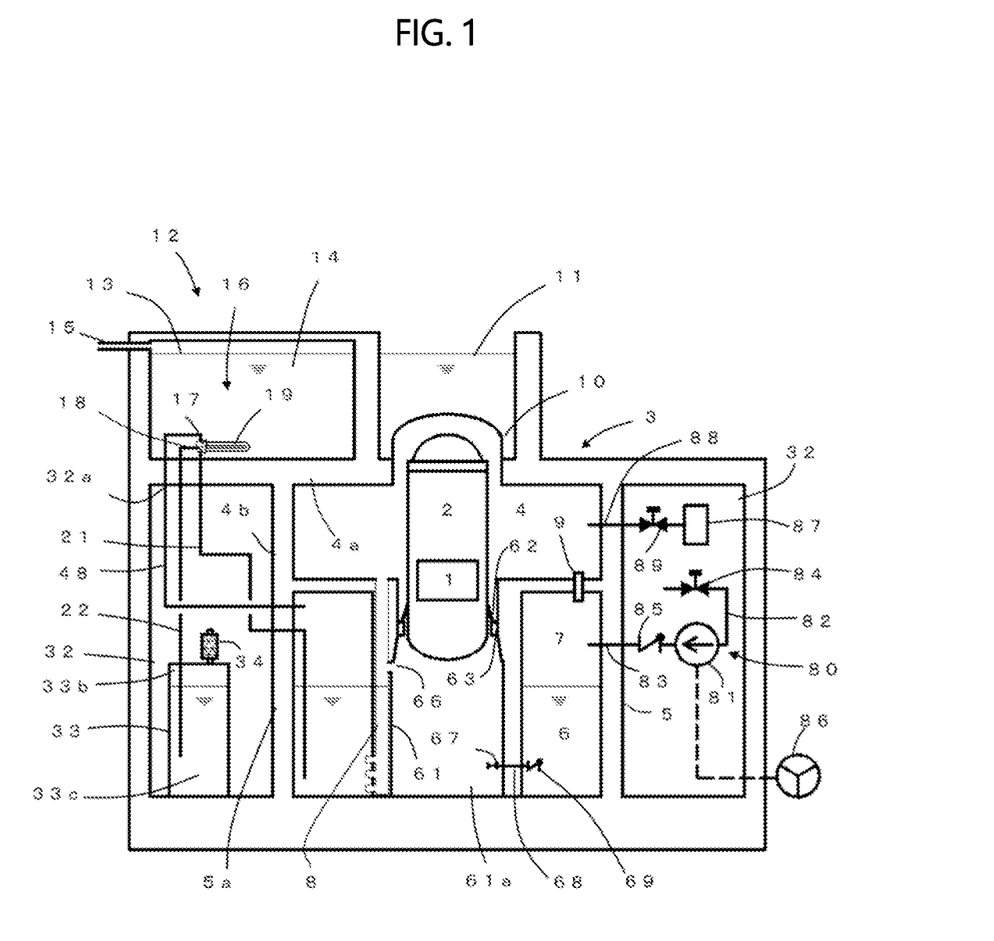
FIG. 1 is a sectional elevational view showing a configuration around a containment vessel of a nuclear plant according to a first embodiment of the present invention.
Figure 2:
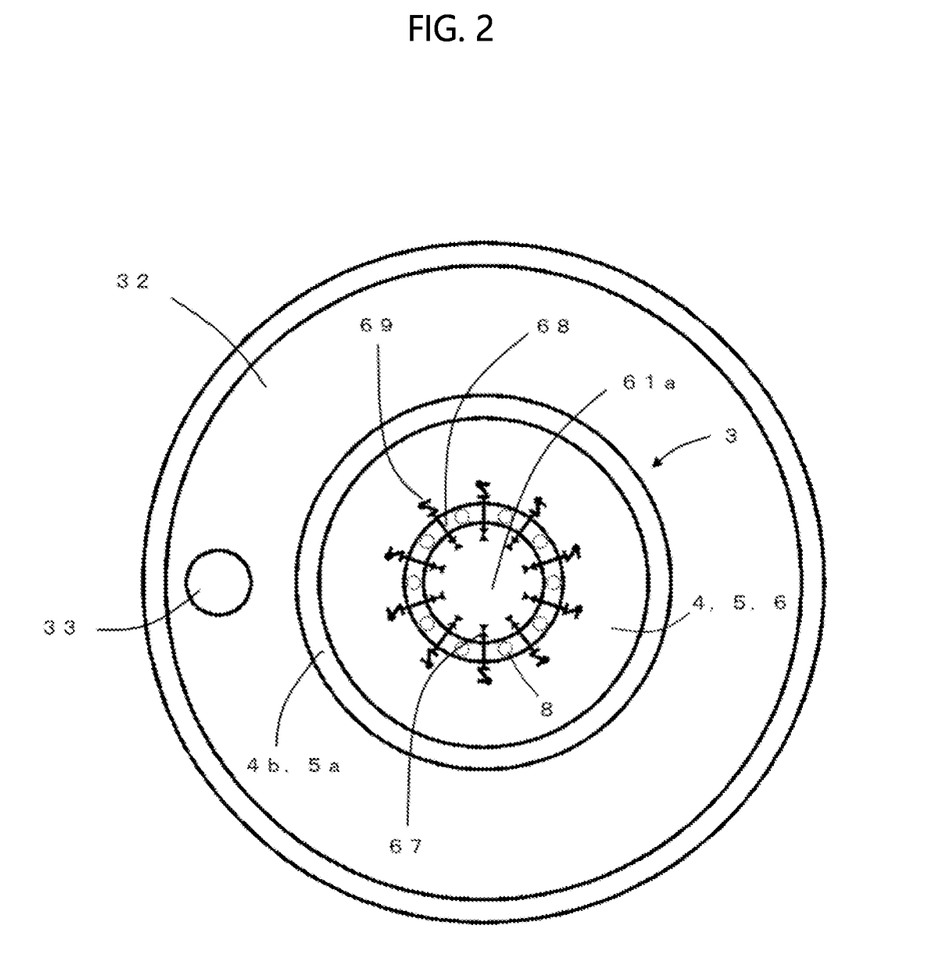
FIG. 2 is a plan view showing the configuration around the containment vessel of the nuclear plant according to the first embodiment of the present invention.

FIG. 1 is a sectional elevational view showing a configuration around a containment vessel of a nuclear power plant according to a first embodiment of the present invention. FIG. 2 is also a plan view showing the configuration around the containment vessel of the nuclear power plant according to the first embodiment of the present invention. The embodiment shown in FIGS. 1 and 2 uses a containment vessel called RCCV, whereas the type of the containment vessel is not limited to an RCCV. The embodiment is universally applied to all containment vessels of pressure suppression type having a pressure suppression function using a suppression pool. Other materials such as an SC composite and steel may also be used.

In FIG. 1, a core 1 is contained in a reactor pressure vessel 2. The reactor pressure vessel 2 is contained in a containment vessel 3. The containment vessel 3 has a cylindrical shape (See FIG. 2)

The interior of the containment vessel 3 is partitioned into a dry well 4, which contains the reactor pressure vessel 2, and a wet well 5. The dry well 4 and the wet well 5 each constitutes a part of the containment vessel 3. The wet well 5 forms a suppression pool 6 inside. A wet well gas phase 7 is formed above the suppression pool 6. The outer wall parts of the dry well 4 and the wet well 5 are integrated to constitute a cylindrical outer wall part of the containment vessel 3. The ceiling part of the dry well 4 is a flat plate, which will be referred to as a top slab 4a of the dry well 4. The atmosphere in the containment vessel 3 is inerted by nitrogen. In this way, for example, a concentration of oxygen in the containment vessel 3 is limited to not more than 3.5% in volume during normal operation.

<Explanation of an Outer Well>

In the present embodiment, an outer well 32 is provided outside the dry well 4 and the wet well 5. The outer well 32 adjoins the dry well 4 via a dry well common part wall 4b, and adjoins the wet well 5 via a wet well common part wall 5a. The ceiling part of the outer well 32 is a flat plate, which will be referred to as a top slab 32a of the outer well 32. The atmosphere in the outer well 32 is inerted by nitrogen. In this way, for example, a concentration of oxygen in the outer well 32 is limited to not more than 3.5% in volume during normal operation. The outer well 32 has pressure resistance and gastightness equivalent to those of the dry well 4 and the wet well 5.

The same materials as those of the containment vessel 3 may all be used for the outer well 32, such as reinforced concrete (RC), an SC composite, and steel. In the case of reinforced concrete, liners are laid on the inner surfaces as with the containment vessel 3. As shown in FIG. 2, the outer well 32 according to the present embodiment has a circular shape in a top plan view and is configured to surround completely the dry well common part wall 4b and the wet well common part wall 5b of the dry well 4 and the wet well 5. However, the plane shape of the outer well 32 is not limited thereto. The outer well 32 may have any shape as long as the outer well 32 adjoins and surrounds completely the dry well common part wall 4b and the wet well common part wall 5b of the containment vessel 3. Examples may include a trapezoidal shape, a polygonal shape, an oval shape and so on.

<Explanation of a Scrubbing Pool>

Further, a scrubbing pool 33 storing water inside is arranged in the outer well 32. A lid 33a covers the top of the scrubbing pool 33 (See FIG. 7). A space 33b is formed between the lid 33a and the pool water. A first outlet pipe 33c opening to the space 33b is arranged on the top of the lid 33a. A metal fiber filter 34 is connected to and arranged on one end of the first outlet pipe 33c. The metal fiber filter 34 is further connected with a second outlet pipe 34a which opens to the interior of the outer well 32 at the other end.

The space 33b is needed if the water level rises as the gas in the containment vessel 3 is vented from the gas vent pipe 22. The lid 33a is needed to prevent the water from flowing out due to sloshing at the time of an earthquake. While only one metal fiber filter 34 is shown in the drawings, a plurality of metal fiber filters 34 may be installed. For example, four PCCS heat exchangers 16, four gas vent pipes 22, four scrubbing pools 33, and four metal fiber filters 34 may be installed. Alternatively, four PCCS heat exchangers 16 may be installed with two integrated gas vent pipes 22, two scrubbing pools 33 and two metal fiber filters 34. The scrubbing pool 33, the lid 33a, and the space 33b may be configured as an integrated tank.

The total volume of the scrubbing pool 33 is about 240 $m^3$. For example, the volume of the pool water is about 200 $m^3$ and the volume of the space 33b is about 40 $m^3$, although these numbers differ depending on design. A large amount of steam much more than decay heat equivalent is generated from a break flow in the dry well 4 in a loss of coolant accident. The generated steam in a loss of coolant accident is vented by the LOCA vent pipes 8 and condensed by the pool water of the suppression pool 6. Since the passive containment cooling system 12 of the present embodiment sucks a gas from the wet well gas phase 7, it does not suck a large amount of steam generated in a loss of coolant accident in the dry well 4. Further, the heat exchanger 16 of the passive containment cooling system 12 condenses steam generated in the wet well gas phase 7 by decay heat in a severe accident. Therefore, there is no chance that a large amount of steam is vented to the scrubbing pool 33. The scrubbing pool 33 according to the embodiment does not have a function to condense a large amount of steam in a loss of coolant accident. Therefore, the amount of the pool water in the scrabbing pool 33 can be small and the volume of the scrubbing pool also can be small.

<Explanation of a Passive Containment Cooling System>

Now, explanation of the passive containment cooling system 12 is provided. As shown in FIG. 1, a cooling water pool 13 is arranged above the containment vessel 3 and the outer well 32. The cooling water pool 13 stores cooling water 14 inside. The cooling water pool 13 may be of either a pool type or a tank type. FIG. 1 shows an example of a pool type. In the case of the pool type, the top of the cooling water pool 13 is covered with a lid. An exhaust port 15 for releasing steam to the environment is arranged on the gas phase in the upper part of the cooling water pool 13.

A heat exchanger 16 is installed in the cooling water pool 13. The heat exchanger 16 is installed to be submerged at least in part in the cooling water 14. The present embodiment describes an example where the heat exchanger 16 is completely submerged in the cooling water 14. The heat exchanger 16 in total has cooling capacity to condense steam equivalent to decay heat. A wet well gas supply pipe 48 is connected to the inlet plenum 17 of the heat exchanger 16.

A condensate return pipe 21 is connected to the lower part of the outlet plenum 18. The condensate return pipe 21 penetrates the top slab 32a of the outer well 32, passes inside the outer well 32, and has a tip submerged in the suppression pool 6 in the wet well 5. Since the condensate return pipe 21 is arranged to pass inside the outer well 32, it is configured that radioactive materials such as CsI are not released directly into the environment even if condensate leakage occurs. Although plenty of particulate radioactive materials such as CsI are included in the atmosphere in the containment vessel 3 in a core melt accident, most of the particulate radioactive materials are transferred into the condensate when steam condenses in the heat exchanger 16. Since the condensate including the plenty of CsI is returned into the pool water in the suppression pool 6 by the condensate return pipe 21 and held therein, the passive containment cooling system of the embodiment is configured to remove passively the airborne particulate radioactive materials in the containment vessel 3. Therefore, the present embodiment, even if a core melt accident happens due to a station blackout (SBO), has an equivalent effect as if an active containment spray washes out particulate radioactive materials and returns them into the pool water in the suppression pool 6. Further, since the condensate return pipe 21 is not arranged into the LOCA vent pipe 8, the present embodiment is configured not to increase pressure drop in the LOCA vent pipe 8 in a LOCA.

Further, the gas vent pipe 22 is connected to the upper part of the outlet plenum 18. The gas vent pipe 22 penetrates the top slab 32a of the outer well 32, passes inside the outer well 32, and has a tip arranged being submerged in the scrubbing pool 33. As the gas vent pipe 22 is arranged as such passing inside the outer well 32, it is configured that radioactive materials such as noble gases, organic iodine, and CsI are not released directly to the environment even if gases leak out. Among them it is configured that particulate radioactive materials such as CsI are scrubbed in the pool water of the scrubbing pool 33, and furthermore those carried over by water droplet are removed by the metal fiber filter 34. Owing to this it became possible to eliminate the necessity of long-term relocation of the surrounding population by land contamination due to release of particulate radioactive materials such as CsI. Radioactive noble gases and organic iodine are released to the outer well 32 through the second outlet pipe 34a and also held up inside the outer well 32. Owing to this, in the present embodiment, it became possible to eliminate the necessity of emergency evacuation of surrounding population beforehand or iodine prophylaxis, whereas those emergency responses are necessary in the older conventional nuclear power plant as the conventional filtered venting system releases radioactive noble gases and organic iodine directly to the environment when activated.

Further, in the present embodiment, it is possible to keep the pressure of the dry well 4 and the wet well 6 sufficiently low even if a large amount of hydrogen generated by metal-water reaction of fuel cladding in a severe accident because hydrogen is also released into the outer well 32 by the gas vent pipe 22. As the atmosphere in the outer well 32 is inerted by nitrogen, no detonation occurs even if a large amount of hydrogen is contained therein.

<Explanation of a Flooding Pipe>

In the present embodiment, a flooder pipe 68 for flooding the lower dry well is provided through the wall of the pedestal 61. The flooder pipe 68 is led into the lower dry well (pedestal cavity) 61a at one end, and opens in the suppression pool 6 at the other end. A flooder valve 67 is arranged on the part of the flooder pipe 68 inside the lower dry well 61a. A check valve 69 is arranged on the flooder pipe 68. The provision of the check valve 69 can prevent high-temperature water in the lower dry well 61a from flowing back to the suppression pool 6, even if the pressure in the dry well 4 increases. For example, a total of ten flooder pipes 68 are installed to not overlap with the LOCA vent pipes 8 in intermediate positions between the LOCA vent pipes (See FIG. 2).

The flooder valves 67 may be fusible valves. Fusible valves melt and open by heat of debris. Besides fusible valves, however, any valves that do not need AC power for operation at the time of an SBO can be used. For example, squib valves which use an explosive for operation may be employed. Spring valves which use spring force for operation may also be employed. For improved reliability, five of the ten flooder valves may be squib valves and the other five may be spring valves. Otherwise, five may be fusible valves and the other five may be squib valves. At least two or more types among fusible, squib, and spring valves may be used in combination.

<Explanation of iCAD>

In the present embodiment, further, an in-Containment Atmosphere Dilution System 80, which will be referred to as iCAD 80, is arranged in the outer well 32. The iCAD 80 comprises a ventilation means 81, an intake pipe 82 and an exhaust pipe 83. The ventilation means 81 may be any means that can ventilate a gas such as, for example, a compressor, a pump, and a fan. The ventilation capacity of the ventilation means 81 is, for example, about 100 m$^3$/h, although it changes depending on design. The intake pipe 82 and the exhaust pipe 83 are connected to the ventilation means 81. The other end of the intake pipe 82 is open to the interior of the outer well 32. The other end of the exhaust pipe 83 is open to the gas phase of the containment vessel 3. In the present embodiment, it is shown as an example that the other end of the exhaust pipe 83 is open to the wet well gas phase 7. An inlet valve 84 is arranged on the intake pipe 82. Although it is shown as an example that the inlet valve 84 is a motor operated valve, the inlet valve 84 may be any other valve such as an air operated valve, a squib valve, a check valve, and a spring valve. An outlet valve 85 is arranged on the exhaust pipe 83. Although it is shown as an example that the outlet valve 85 is a check valve, the outlet valve 85 may be any other valve such as a motor operated valve, air operated valve, a squib valve and a spring valve. In the case, however, where the ventilation means 81 itself has a closing function, the inlet valve 84 and the outlet valve 85 are not necessary. The iCAD 80 is powered by a power source 86. The power source 86 may be arranged as an installed system. However, the power source 86 may be arranged as a mobile system if there is enough time before operation.

<Explanation of an Accumulator>

In the present embodiment, an accumulator 87 is further arranged. The accumulator 87 contains pressurized nitrogen therein. The capacity of the accumulator 87 is, for example, to release about 100 m³ of nitrogen in the containment vessel 3 at the design pressure (for example, 310 kPa). The volume of the accumulator 87 is, for example, 15 m³. An injection pipe 88 is connected to the accumulator 87 and open to the gas phase of the containment vessel 3. An injection valve 89 is arranged on the injection pipe 88. Although it is shown as an example that the injection valve 89 is an motor operated valve, the injection valve 89 also may be an air operated valve and a squib valve.

<Explanation of the Function of the iCAD>

In the present embodiment, configured as such, a large amount of hydrogen generated by metal-water reaction of the heated fuel cladding in a severe accident and nitrogen and oxygen existing in the dry well 4 during normal operation will be transferred into the wet well gas phase 7. A large amount of hydrogen generated in the reactor pressure vessel 2 is transferred to the wet well gas phase 7 mainly via the safety relief valve 72 and the discharge pipe 73 (See FIG. 5). The noncondensable gases in the dry well 4 such as nitrogen, hydrogen and oxygen are pushed by a large amount of steam generated in a severe accident and transferred to the wet well gas phase 7 via the LOCA vent pipes 8. There are also a large amount of nitrogen and oxygen that has been existing during normal operation in the wet well gas phase 7. The pressure in the wet well gas phase 7 will increase as a large amount of hydrogen and noncondensable gases in the dry well 4 are transferred additionally. The noncondensable gases in the wet well gas phase 7 flow into the heat exchanger 16 of the passive containment cooling system 12 via the wet well gas supply pipe 48 due to the increase of gas pressure itself in the short time and caring over by the steam generated from the pool water in the suppression pool 6 in the long time in a severe accident. Seam is condensed and become condensate in the heat exchanger tubes 19 of the heat exchanger 16. The condensate returns to the suppression pool 6 via the outlet plenum 18 and the condensate return pipe 21. Almost all the noncondensable gases that are not condensed in the heat exchanger tubes 19 are led to the scrubbing pool 33 through the outlet plenum 18 and the gas vent pipe 22 and finally transferred into the interior of the outer well 32. As a result, the dry well 4 and the wet well gas phase 7 is mostly occupied only by steam. There are also residual noncondensable gases that are not completely transferred to the outer well 32 constituting a mixture gas with steam in the heat exchanger tubes 19, the outlet plenum 18 and the gas vent pipe 22 of the passive containment cooling system 12. The concentration of the residual noncondensable gases is about 50% and the concentration of steam is about 50%. Out of the mixture gas, the volume of the noncondensable gases is very small and about 10 m³. This is because the total free volume of the heat exchanger tubes 19, the outlet plenum 18 and the gas vent pipe 22 of the passive containment cooling system 12 is only about 20 m³. Further, the concentration of oxygen in the mixture gas is lowered to about 1% owing to the dilution by steam.

The containment vessel 3 and the outer well 32 are inerted by nitrogen to limit the concentration of oxygen no more than 3.5% during normal operation. Therefore, no detonation of hydrogen occurs even if a large amount of hydrogen is generated and transferred into the passive containment cooling system 12 and the outer well 32. The concentration of oxygen in the outer well 32 is rather diluted by the large amount of hydrogen generated in a severe accident form 3.5% to about 2%. Moreover, the concentration of oxygen in the passive containment cooling system 12 is further diluted by steam to about 1%.

As the core 1 melts in a severe accident, a debris drops on the bottom of the reactor pressure vessel 2, melts the bottom of the reactor pressure vessel 2 and drops onto the lower part of the lower dry well 61*a*. As the flooder valves 67 open due to the heat of the debris, the pool water in the suppression pool 6 flows into the lower dry well 61*a* through the flooder pipes 68 and floods the debris. The flooded water is heated by the decay heat of the debris and continues to generate a large amount of steam. This steam is released to the suppression pool 6 and condenses therein. As the pool water becomes saturated and unable to condense steam, the steam will be released to the wet well gas phase 7 and transferred further to the heat exchanger 16 of the passive containment cooling system 12 by the wet well gas supply pipe 48. The steam is cooled by the heat exchanger tubes 19 of the heat exchanger 16 and condensed. The condensate is accumulated in the lower part of the outlet plenum 18 and recycled to the suppression pool 6 by the condensate return pipe 21. The pool water of the suppression pool 6 is also recycled again into the lower dry well 61*a* through the flooder pipes 68. In this way, steam and water are recycled between the containment vessel 3 and the interior of the passive containment cooling system 12. In the recycling, heat of the steam is transferred to the cooling water 14 in the cooling water pool 13. After saturation of the cooling water 14, steam is generated from the cooling water 14 and released to the environment through the exhaust port 15.

The water flooding the debris in the lower drywell 61*a* is irradiated by the radiation of a large amount of fission products (FP) contained in the debris and generates hydrogen and oxygen due to radiolysis. These hydrogen and oxygen generated by radiolysis are also carried over by steam and transferred to the wet well gas phase 7 through the LOCA vent pipes 8. Since the amount of steam generated by heat of the debris is very large and about 10,000 m³/h, the hydrogen and oxygen generated by radiolysis do not remain in the dry well 4 and vented to the wet well gas phase 7 immediately even if generated. Owing to this, the dry well 4 becomes mostly occupied only by steam. Therefore, no hydrogen detonation occurs in the dry well 4. Further, since a flammable gas hardly exists in the dry well 4, a countermeasures like the conventional flammable gas control system (FCS) that takes in the gases from the dry well 4 and recombines them is not effective.

Significant portion of FP is released into the containment vessel 3 from the melted core and the debris in a severe accident. Some part of the released FP is plated out or fallen out on the wall or floor of the containment vessel 3. However, some part of the released FP is transferred to the suppression pool 6. This happens because the FP are also transferred to the suppression pool 6 by carrying over by steam and gases flowing through the safety relief valve 72 or the LOCA vent pipe 8. The amount defers depending on a severe accident scenario. The water in the suppression pool 6 absorbs radiation from the FP in the water and generates hydrogen and oxygen by radiolysis in the water. A considerable amount of the hydrogen and oxygen by radiolysis move out of the pool water and transfer to the wet well gas phase 7.

As stated above, in a severe accident, the hydrogen and oxygen generated by radiolysis in the dry well 4 are transferred to the wet well gas phase 7 in a very short time. The hydrogen and oxygen generated form the water of the suppression pool 6 by radiolysis are also transferred to the wet well gas phase 7. The rate of generation of hydrogen and oxygen by radiation is decided by G value. Since G value is small, generation of hydrogen and oxygen is very moderate. The wet well gas phase 7 is inerted by nitrogen to limit the concentration of oxygen no more than 3.5% during normal operation. Further, the concentration of oxygen is even lowered to about 2% by dilution of a large amount of hydrogen generated by metal-water reaction. Therefore, although hydrogen and oxygen are generated by radiolysis in the wet well gas phase 7, no detonation of hydrogen occurs in the wet well gas phase 7. In a severe accident, the water in the suppression pool 6 becomes saturated in 10 and several hours by the decay heat and afterwards generates continuously a large amount of steam equivalent to the decay heat. Since the flow rate of this steam is very large and about 10,000 m$^3$/h, even if hydrogen and oxygen are generated by radiolysis, not remaining in the wet well gas phase 7, they are immediately carried over by the large amount of steam and flow into the heat exchanger 16 of the passive containment cooling system 12 thorough the wet well gas supply pipe 48. Since hydrogen and oxygen do not condense, they are transferred through the outlet plenum 18 and the gas vent pipe 22 and finally vented to the interior of the outer well 32. The interior of the outer well 32 is inerted by nitrogen to limit the concentration of oxygen no more than 3.5% during normal operation. Further, the concentration of oxygen is lowered to about 2% by dilution of a large amount of hydrogen generated by metal-water reaction. Therefore, even if hydrogen and oxygen generated by radiolysis are transferred to the outer well 32, no detonation of hydrogen occurs in the outer well 32.

Although generation of hydrogen and oxygen by radiolysis is moderate, it continues for a long time and does not cease. The hydrogen and oxygen generated by radiolysis are transferred to the wet well gas phase 7 and, with a large amount of steam, continue to flow into the passive containment cooling system 12. As this process continues, the concentration of oxygen in the heat exchanger tubes 19, the outlet plenum 18 and the gas vent pipe 22 of the passive containment cooling system 12 rises from the original about 1% to about 17%. The concentration of hydrogen also increases to about 33%. Further, the concentration of oxygen in the space 33b of the scrubbing pool 33 rises from the original about 2% to about 34%. The concentration of hydrogen also rises to about 66%, Since these components are a passive component and do not have any active parts, there is nothing to cause ignition. However, it is necessary to prevent the formation of such a high concentration flammable gas. Since radiolysis is a moderate phenomenon, there is a considerable time until such a high concentration flammable gas is formed.

In the present embodiment, the iCAD 80 is operated. The iCAD 80 returns the noncondensable gas having a low concentration of oxygen in the outer well 32 into the wet well gas phase 7. The inlet valve 84 is opened and the ventilation means 81 is operated by the power supply from the power source 86. By doing so, the noncondensable gas in the outer well 32 is sucked from the intake pipe 82, ventilated by the ventilation means 81 and flows into the wet well gas phase 7 thorough the exhaust pipe 83 and the outlet valve (check valve) 86. The flow rate is about 100 m$^3$/h although it changes depending on design. The concentration of oxygen of the noncondensable gas in the outer well 32 is limited to about 2%. Namely, it is a noncondensable gas having a low concentration of oxygen. The noncondensable gas having a low concentration of oxygen injected by the iCAD 80 into the wet well gas phase 7 is mixed with the hydrogen and oxygen generated in the wet well gas phase 7 by radiolysis and make a mixture gas. The mixture gas is led into the interior of the passive containment cooling system 12. Since the flow rate of the hydrogen and oxygen generated by radiolysis is very small, the concentration of oxygen of the mixture gas is limited under the inflammability limit (5%). As a result, as the iCAD 80 is operated, it becomes possible to prevent the formation of flammable gas in the passive containment cooling system 12 and the scrubbing pool 33. The noncondensable gas having a low concentration of oxygen injected by the iCAD 80 into the wet well gas phase 7 is ventilated to the heat exchanger 16 of the passive containment cooling system 12 through the wet well gas supply pipe 48 and returned again into the interior of the outer well 32 through the gas vent pipe 22. In this way, since the noncondensable gas only circulates between the outer well 32 and the containment vessel 3, the containment vessel 3 is never pressurized by the operation of the iCAD 80.

Further, in the present embodiment, by opening the injection valve 89, the accumulator 87 can inject the nitrogen pressurized and contained therein into the dry well 4 thorough the injection pipe 88. The volume of the nitrogen is about 100 m$^3$ at the design pressure of the containment vessel 3 (for example, about 310 kPa). Although about 100 m$^3$ of nitrogen is injected, since the free volume of the containment vessel 3 is about 13,300 m$^3$, the pressure in the containment vessel 3 hardly increases in a severe accident. As about 100 m$^3$ of nitrogen is injected into the dry well 4, the nitrogen is carried over by a large amount of steam in the dry well 4 and transferred to the wet well gas phase 7 in a short time. The nitrogen is further transferred into the passive containment cooling system 12 through the wet well gas supply pipe 48. A mixture gas has been existing in the heat exchanger tubes 19, the outlet plenum 18 and the gas vent pipe 22 of the passive containment cooling system 12. The concentration of oxygen in the mixture gas has been lowered to about 1% owing to the dilution effect of steam. A noncondensable gas also has been existing in the space 33b of the scrubbing pool 33. The concentration of oxygen of the noncondensable gas has been lowered to about 2% owing to the dilution effect by hydrogen. However, by injecting about 100 m$^3$ of nitrogen by the accumulator 87, it becomes possible to reduce the oxygen concentration in those components almost 0 once. In this way, it becomes possible to prolong the time until a flammable gas is formed in those components by hydrogen and oxygen generated by radiolysis. In this way, it becomes possible to prolong the timing for the activation of the iCAD 80.

Second Embodiment

Figure 3:
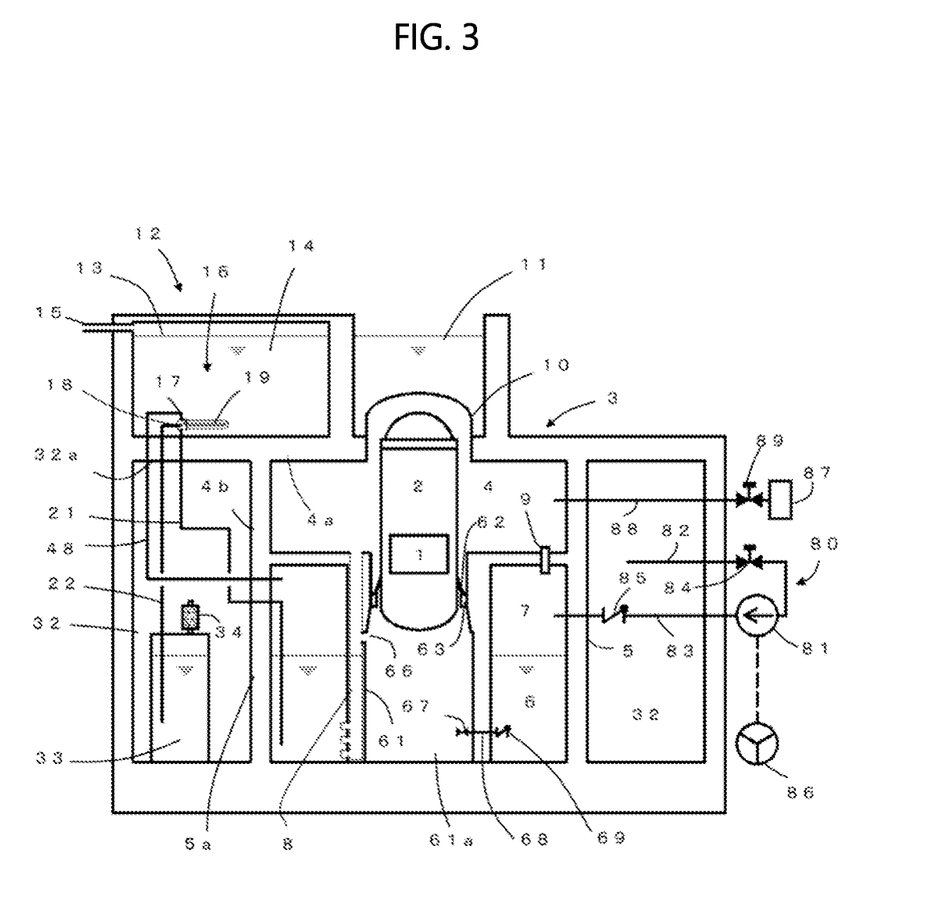
FIG. 3 is a sectional elevational view showing a configuration around a containment vessel of a nuclear plant according to a second embodiment of the present invention.

FIG. 3 is a sectional elevational view showing a configuration around a containment vessel of a nuclear plant according to a second embodiment of the present invention. In the present embodiment, the ventilation means 81, a part of the intake pipe 82 and the inlet valve 84 are arranged outside of the outer well 32. The accumulator 87, a part of the injection pipe 88 and the injection valve 89 are arranged outside of the outer well 32. As configured in this way, in the present embodiment, manual operation will be possible by accessing to the main parts of the iCAD 80 and the accumulator 87 in case of failures of these components and the like.

Third Embodiment

Figure 4:
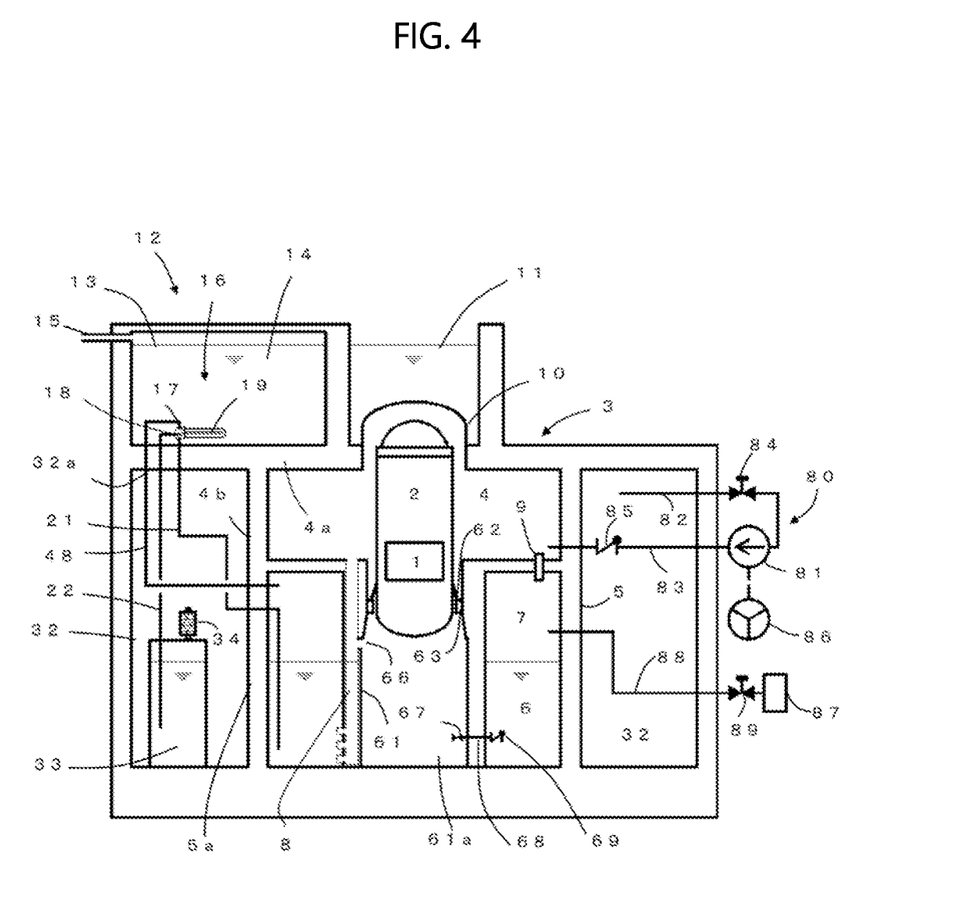
FIG. 4 is a sectional elevational view showing a configuration around a containment vessel of a nuclear plant according to a third embodiment of the present invention.

FIG. 4 is a sectional elevational view showing a configuration around a containment vessel of a nuclear plant according to a third embodiment of the present invention. In the present embodiment, the exhaust pipe 83 of the iCAD 80 is connected to the dry well 4. Further, the injection pipe 88 of the accumulator 87 is connected to the wet well gas phase 7. In the present embodiment, it is possible that the accumulator 87 can inject nitrogen into the wet well gas phase 7 more quickly and inert the passive containment cooling system 12 and the scrubbing pool 33 by nitrogen more quickly.

Other Embodiments

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

EXPLANATION OF THE REFERENCE NUMERALS

1: core; 2: reactor pressure vessel; 3: containment vessel; 4: dry well; 4a: top slab; 4b: dry well common part wall; 5: wet well; 5a: wet well common part wall; 6: suppression pool; 7: wet well gas phase; 8: LOCA vent pipe; 8a: horizontal vent pipe; 9: vacuum breaker; 10: containment vessel head; 11: water shield; 12' passive containment cooling system (PCCS); 13: cooling water pool; 14: cooling water; 15: exhaust port; 16: heat exchanger; 17: inlet plenum; 18: outlet plenum; 19: heat exchanger tube; 20: gas supply pipe; 20a: isolation valve; 21: condensate return pipe; 22: gas vent pipe; 23: tube plate; 32: outer well; 32a: top slab; 33: scrubbing pool; 33a: lid; 33b: space; 33c: first outlet pipe; 34: metal fiber filter; 34c: second outlet pipe; 48: wet well gas supply pipe; 61: pedestal; 61a: pedestal cavity (lower dry well); 62: RPV skirt (vessel skirt); 63: RPV support (vessel support); 66: opening; 67: flooder valve; 68: flooder pipe; 69: check valve (flooder check valve); 71: main steam pipe; 72: safety relief valve (SRV); 73: discharge pipe; 80: in Containment Atmosphere Dilution System (iCAD); 81: ventilation means; 82: intake pipe; 83: exhaust pipe; 84: inlet valve; 85: outlet valve (check valve); 86: power source; 87: accumulator; 88: injection pipe; 89: injection valve

What is claimed is:

1. A nuclear plant comprising:
a core,
a reactor pressure vessel containing the core,
a containment vessel including:
a dry well containing the reactor pressure vessel,
a wet well containing a suppression pool in a lower part thereof, and a wet well gas phase in an upper part thereof,
a LOCA vent pipe connecting the dry well and the suppression pool
a vacuum breaker that circulates gas in the wet well gas phase to the dry well, and
a pedestal that supports the reactor pressure vessel in the containment vessel via an RPV skirt and forms a pedestal cavity inside,
an outer well that is arranged outside the dry well and the wet well, adjoins the dry well via a dry well common part wall, adjoins the wet well via a wet well common part wall, surrounds completely the dry well common part wall and the wet well common part wall, and has pressure resistance and gastightness equivalent to pressure resistance and gastightness of the dry well and the wet well,
a passive containment cooling system including:
a scrubbing pool that is arranged in the outer well and stores water inside;
a cooling water pool that is installed above the dry well and the outer well and reserves cooling water;
a heat exchanger that has an inlet plenum, an outlet plenum, and a heat exchanger tube, and is submerged at least in part in the cooling water;
a wet well gas supply pipe that is connected to the inlet plenum of the heat exchanger at one end and connected to the wet well gas phase at the other end to lead a gas in the wet well gas phase to the heat exchanger;
a condensate return pipe that is connected to the outlet plenum of the heat exchanger at one end, passes through the outer well, and is connected to inside the containment vessel at the other end to lead condensate in the heat exchanger into the containment vessel; and
a gas vent pipe that is connected to the outlet plenum of the heat exchanger at one end, passes through the outer well, has the other end installed as submerged in the water in the scrubbing pool in the outer well, and releases noncondensable gas in the heat exchanger to the outer well, and
an in-Containment Atmosphere Dilution System including:
a ventilation means;
an intake pipe that is connected to the ventilation means at one end and opened to inside the outer well at the other end; and
an outlet pipe that is connected to the ventilation means at one end and opened to inside the containment vessel at the other end, wherein the ventilation means is configured to transfer a gas from the outer well into the containment vessel via the intake pipe and the outlet pipe.

2. The nuclear plant according to claim 1, further comprising:
an accumulator that contains pressurized nitrogen therein;
an injection pipe that is connected to the accumulator at one end and opened to inside of the containment vessel at the other end; and
an injection valve arranged on the injection pipe.

* * * * *